United States Patent [19]
Jones et al.

[11] Patent Number: 5,623,637
[45] Date of Patent: Apr. 22, 1997

[54] ENCRYPTED DATA STORAGE CARD INCLUDING SMARTCARD INTEGRATED CIRCUIT FOR STORING AN ACCESS PASSWORD AND ENCRYPTION KEYS

[75] Inventors: Michael F. Jones, Nashua, N.H.; Arthur Zachai, Swampscott, Mass.

[73] Assignee: Telequip Corporation, Hollis, N.H.

[21] Appl. No.: 651,205

[22] Filed: May 17, 1996

Related U.S. Application Data

[63] Continuation of Ser. No. 161,854, Dec. 6, 1993, abandoned.

[51] Int. Cl.$^6$ .................................................. G06F 12/14
[52] U.S. Cl. ........................ 395/491; 395/430; 395/442; 395/833; 395/188.01; 380/23; 380/25
[58] Field of Search .................................. 380/23, 25, 4; 395/188.01, 430, 442, 490, 491

[56] References Cited

U.S. PATENT DOCUMENTS

| | | | |
|---|---|---|---|
| 5,068,894 | 11/1991 | Hoppe | 380/23 |
| 5,124,117 | 6/1992 | Tatebayashi et al. | 380/21 |
| 5,204,663 | 4/1993 | Lee | 340/825.34 |
| 5,293,424 | 3/1994 | Holtey et al. | 380/23 |
| 5,307,411 | 4/1994 | Anvret et al. | 380/25 |
| 5,341,428 | 8/1994 | Schatz | 380/23 |
| 5,347,580 | 9/1994 | Molva et al. | 380/25 |
| 5,379,344 | 1/1995 | Larsson et al. | 380/23 |
| 5,428,685 | 6/1995 | Kadooka et al. | 380/25 |
| 5,448,045 | 9/1995 | Clark | 380/25 |

OTHER PUBLICATIONS

"Applied Cryptography" Bruce Schneier, John Wiley & Sons, Inc., 1994, pp. 219–243.

Primary Examiner—Reba I. Elmore
Attorney, Agent, or Firm—Banner & Witcoff, Ltd.

[57] ABSTRACT

A detachable PCMCIA memory card incorporating a smartcard integrated circuit for storing a password value and logic circuitry for preventing access to information stored on the memory card unless the user of the host computer to which the memory card is connected can supply a password matching the stored password. The smartcard integrated circuit may also be used to store public and private key values used to encrypt and decrypt data stored on the card or elsewhere on the host computer or exchanged with a remote computer.

3 Claims, 2 Drawing Sheets

ENCRYPTED DATA STORAGE CARD INCLUDING SMARTCARD INTEGRATED CIRCUIT FOR STORING AN ACCESS PASSWORD AND ENCRYPTION KEYS

This application is a continuation of application Ser. No. 08/161,854 filed Dec. 6, 1993, abandoned.

FIELD OF THE INVENTION

This invention relates generally to methods and apparatus for storing, processing and communicating private data.

BACKGROUND OF THE INVENTION

Computers are widely used to store and process information which is considered private. For most businesses, the confidentiality of computer data is maintained using the practice followed for conventional business data: restricting access to office space where sensitive records are kept, whether those records take the form of documents kept in file cabinets or machine-readable data stored in an computer.

As the capabilities and usefulness of laptop and notebook computers have increased, functions formerly performed within the security of the office have moved to the field. Sales personnel and executives often travel with computers loaded with confidential data on pricing, customers, and strategic planning. Although available encryption and decryption programs can be used to protect such data when it is not in use, these programs are often inconvenient to use or provide poor security as a result of inadequate key management.

Encryption methods typically rely on "secret keys" known only to authorized users of the protected data. In the widely used Data Encryption Standard ("DES") developed and promulgated by the National Bureau of Standards, data is encyphered in 64-bit blocks using a single 56-bit key, as described in National Bureau of Standards' Federal Information Processing Standards Publication 46, "Data Encryption Standard," National Bureau of Standards (1977). Encryption techniques using two keys, one for encypting the data and a different key for decryption, are called "public key" systems because the encryption key can be made public so that anyone can use the public key to encrypt sensitive data, but only a recipient with the secret key can decrypt it. One widely used and highly effective public key algorithm known as the "RSA" system, named after the inventors Rivest, Shamer and Adelman, is described in Rivest et al. U.S. Pat. No. 4,405,829.

The security of both single-key and public-key encryption systems depends on user's ability to keep the key or keys secret. Although both the DES and RSA encryption algorithms themselves can be depended upon to provide adequate security, neither system can safeguard data if the keys can be learned. The management of the keys themselves accordingly presents the most difficult component of good data security system.

SUMMARY OF THE INVENTION

It is an object of the invention to securely store private information in a compact, easily transportable storage device which may be detached from the computer with which it is used.

It is still another object of the invention to protect such electronically stored data against unauthorized access when the detachable storage device is lost or stolen.

It is a further object of the present invention to provide a secure data storage device which may, at the option of the user, selectively limit access to all or part of the stored data using one or more passwords.

It is a related object of the invention to securely store access passwords, encryption or decryption keys, or digital signatures, in a tamper-proof substorage unit interconnected with a data access mechanism which are integral parts of a detachable computer memory card.

In a principle aspect, the present invention takes the form of a removable memory card, preferably implemented in conformity with the PCMCIA (Personal Memory Card Industry Association) interface standard, which provides the host computer to which it is connected with additional high-speed storage, the memory card consisting of a data storage unit, storage-access locking circuitry, and a tamper-proof key information substorage unit. In accordance with the invention, the locking circuitry is adapted to prevent access to the data stored on the memory card unless the would-be user first presents identifying information which is validated by the locking circuitry with reference to one or more key values stored in the key information substorage unit.

The removable memory card contemplated by the present invention allows data stored on the card to be made immediately available to the connected host computer upon proper presentation of a password known only to an authorized user. Once the password has been validated, the stored data may then be made available to the host processor in decrypted form.

In accordance with the invention, the key information substorage unit advantageously takes the form of a "smartcard" integrated circuit capable of storing secret key values which may be used to provide password-protected access to the data stored on the memory card, or optionally to provide secure storage for the encryption or decryption keys, or digital signatures, needed to allow the host computer to access and/or operate a secure information storage or telecommunications system. In accordance with the invention, access to data, passwords, digital signatures, or other key values stored on the memory card is limited to those who (1) have physical possession of the memory card and (2) knowledge of the memory card access password stored in the card's secure substorage unit.

The smartcard integrated circuit advantageously stores such passwords, public key and secret key values, and/or digital signatures in an Electrically Erasable Programmable Read Only Memory (EEPROM), and further includes its own microprocessor containing a stored program to allow reading and writing of the EEPROM through a serial I/O interface. The stored program within the smartcard IC allows an access password to be programmed into the EEPROM from an external source via the serial interface, but thereafter prevents that password value from being accessed. For enhanced security, the smartcard integrated circuit includes means for monitoring voltages and frequencies to detect abnormal conditions which may indicate an attempt to tamper with the key storage unit to gain unauthorized access to the stored secret key information.

These and other objects, features and advantages of the present invention will become more apparent by considering the following detailed description of a preferred embodiment of the invention, during which frequent reference will be made to the attached drawings.

DESCRIPTION OF THE PREFERRED EMBODIMENT

HARDWARE

Figure 1:
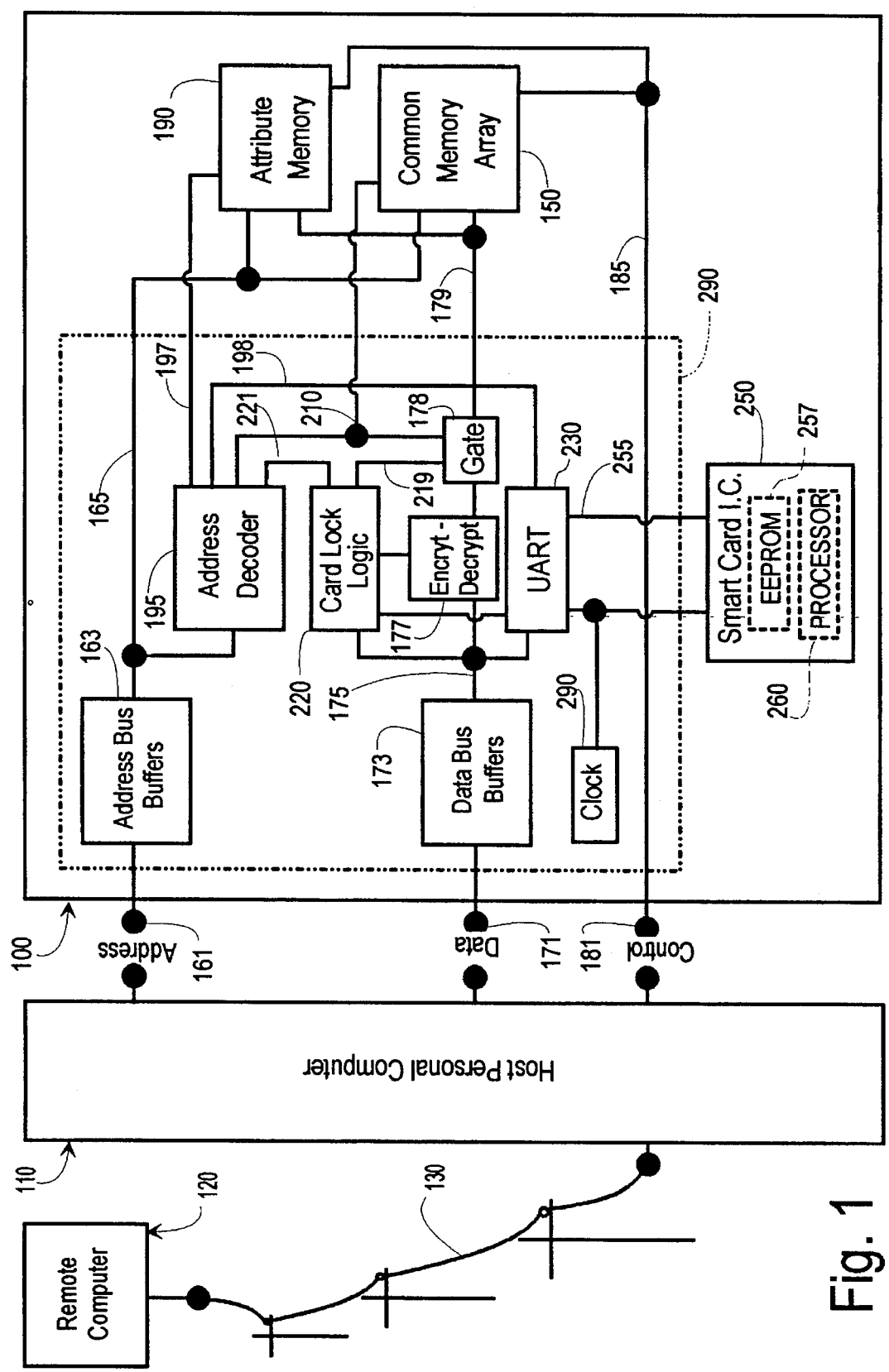
FIG. 1 of the drawings is a block diagram of a secure memory card which embodies the principles of the invention, the memory card being shown interconnected with a host computer which is in turn connected to other computers by telecommunications links.

As illustrated in FIG. 1 of the drawings, the preferred embodiment of the invention takes the form of a personal computer memory card indicated generally at 100. The memory card 100 is interconnected with a host computer 110 by means of a hardware and software interface which conforms to the Personal Computer Memory Card International Association (PCMCIA) standard which has been widely accepted for use in laptop and notebook computers. PCMCIA cards are commonly used to provide additional high-speed memory capacity to the connected host computer, or to implement fax and data modems, network access devices, and hard-disk mass storage devices. Type 1 PCMCIA cards have a form factor typically used to provide additional memory for data and application programs, while the thicker Type 2 cards are used to add telecommunications features and Type 3 cards are used for high-capacity hard disk drives that store up to 100 megabytes of data.

The removable character of PCMCIA storage devices can provide better data security than storage built into the computer itself, because the card may be detached from the computer and placed in a secure area when not in use. However, the cards themselves remain subject to possible theft or misuse. The embodiment of the invention shown in FIG. 1 provides significant additional security for data and programs stored in a detachable memory card by incorporating an access-locking mechanism for preventing access to the stored data by those who are unable to present an authorizing password.

The secure memory card 100 contemplated the invention is adapted to be connected via its PCMCIA interface to the host computer 110 which may in turn be connected to other computers by modem, or by a network, as illustrated by the connection of remote computer 120 via the telecommunications link 130 seen in FIG. 1.

The secure memory card 100 stores data in a common memory array 150, preferably implemented with non-volatile flash memory integrated circuits, enabling the common memory array to store 10 megabytes of data in an area small enough to be included on a credit-card sized Type I PCMCIA card. The data is stored in random access locations specified by address values supplied via the PCMCIA's standard 26-bit address bus terminals 161. The address terminals 161 provide address signals to an input address bus buffer circuit 163 which drives an internal address bus 165. Data transfers between the common memory array 150 and the host computer 110 are accomplished via the interface data terminals 171, a data bus buffer 173, an internal data bus 175, a internal encryption/decryption unit 177, a gate 178 and an internal data bus 179. Control signals are exchanged between the common memory array 150 and the host computer via the PCMCIA interface control terminals 181 and an internal control bus 185.

The address terminals 161, data terminals 171 and control terminals 181 seen in FIG. 1 are a simplified representation of the 68 pin PCMCIA standard interface which includes provision for 26 parallel address conductors (A0–A25), 16 parallel data conductors (D0–D15) and a remaining set of power and control conductors including power and ground connections and a collection of memory control signal connections (enable, select, wait, write, detect, etc.). The PCMCIA standard achieves interchangeability of cards of different functions by establishing standards for the physical card (dimensions and mechanical tolerances for the card and connectors), the card interface (pinout and signal definitions), and card software (which specifies the organization of data on the card and the record formats and protocols by which configuration information and data is exchanged with the host computer). Complete information which defines the PCMCIA standard is published by and available from the Personal Computer Memory Card International Association, 1030G East Duane Avenue, Sunnyvale, Calif. 94086. The present embodiment of invention conforms to the PC Card Standard Specification, Release 2.01, published in November, 1992.

To implement the PCMCIA interface standard, the secure memory card includes a non-volatile attribute memory 190 which stores information enabling the host computer to automatically identify the particular PCMCIA card as soon as the card and host are connected, and to automatically establish the appropriate hardware/software interface using suitable driver software which executes on the host computer 110.

The attribute memory 190 shares the internal address bus 165, data bus 175 and control bus 185 with the common memory array 150. An address decoder 195 monitors the address bus 165 and provides selection signals to the attribute memory 190 via a attribute memory enable line 197 when addresses within the address space of attribute memory 190 appear on address bus 165 concurrently with the activation of the Attribute Memory Select signal terminal -REG (not separately shown in FIG. 1) in the PCMCIA connector interface.

Similarly, the address decoder 195 selects the common memory array 150 whenever the address on address bus 165 is within the address space of array 150 by energizing an common memory enable line 210 which supplies an enable signal to the gate 178 in the data pathway to the common memory array 150.

Gate 178 prevents the common memory array 150 from exchanging data with the host 150 via data bus 179 unless an authorization signal is supplied to the gate 178 via a control line 219 from a card lock logic circuit 220. The card lock logic circuit 220 is connected to address decoder 195 via the lock enable line 221, permitting card logic 220 to identify addresses which designate memory locations in the common memory array 150 to which access may be denied under appropriate circumstances. The card lock logic circuit 220 is connected to the internal data bus 175 which provides a pathway for downloading memory access control commands from the host computer 110.

A smartcard input/output enable line 198 transmits an enable signal from the address decoder 195 to a Universal Asynchronous Receiver Transmitter (UART) 230 when information is to be transferred between the host computer 110 and a smartcard integrated circuit 250. The UART 230 is connected to the internal data bus 175 and operates to translate data received in bit-parallel form from databus 175 into bit serial form for transfer to the smartcard integrated circuit "I.C." via its serial port 255.

The smartcard I.C. includes its own processor 260 and non-volatile EEPROM memory circuits 257 which operate as a secret key information substorage system. The processor 260 within the smartcard I.C. 250 is programmed to store secret key codes within the EEPROM 257, but to thereafter prohibit the stored secret keys from being accessed by any external interrogation. The smartcard I.C. may be implemented with a number of available devices, including the ST16F48 CMSO MCU-based Safeguarded Smartcard IC, with 8k EEPROM, available for SGS-Thomson Microelectronics, a member of the SGS-Thomson ST16XYZ family of devices, as specified in the SGS-Thomson Data Book (April, 1993). The ST16F48 includes an 8-bit processor, 288 bytes of RAM scratchpad storage, an 8k byte EEPROM data memory which forms the secure substorage unit, and a 16k byte program storage read-only memory for storing processing routines, including routines for processing and validating key values supplied to and read from the smartcard I.C. via the UART 230.

Data transfers and operations, both within the memory card 100 and between the card 100 and the host computer 110, are controlled by the card lock logic circuit 220. When the lock circuit enable line 221 is activated in response to the detection of an access control command address value by address decoder 195, the card lock logic circuit 220 responds to commands and data supplied to the internal data bus 175 from the host computer 110 via the data conductors 171 and the data bus buffers 173. The card lock logic circuit 220, the UART 230 and the smartcard I.C. 260 operate under the control of a common timing signal provided by an on-card clock generator circuit seen at 290 in FIG. 1.

The address space provided by the common memory array 150 is preferably partitioned into independently accessed regions. Each partition is specified in a Card Information Structure or "CIS" (to be described) which is stored in the attribute memory 190, and preferably corresponds to the memory space provided by one or more integrated circuits making up the array 150 such that a particular partition may be selected by the address decoder 195 which activates particular chip enable lines with the common memory enable output 210.

The access password itself is stored in the EEPROM 257 within the smartcard I.C. 250, the password storage operation being accomplished within the memory card 100 whenever a card lock logic activation address is supplied via address terminals 161 and the address buffer 163 to the address decoder 195 which in turn activates the card logic enable line 221. A password loading command applied via the data interface terminals 171 from the host computer is recognized by card lock logic 220 which channels the subsequent data sequence (the password itself) via the UART 230 and the serial port 255 of the smartcard I.C. 250 for storage at a predetermined location in the EEPROM 257.

Once a password has been stored for a particular partition, the card lock logic circuit 220 has exclusive control over access to that partition. Any attempt to access that partition (as detected by the address decoder 195) will be rejected, notifying the device driver software that a valid password must be provided. The driver software then prompts the user with a request for a valid password which, when entered, is sent via the data buffer 173 for validation. The card lock logic 220 routes the offered password to the smartcard I.C. with a request that it be compared with the password stored in the EEPROM 257. If the passwords match, the smartcard I.C. so notifies the card lock logic 220 which in turn notifies the device driver software executing in the host that the partition has been successfully unlocked. Thereafter, when addresses within the unlocked partition are detected by the address decoder 195, the card lock logic will activate the gate 178 to permit data transfers between that partition and the data terminals 171.

To provide additional security, the data transferred over the 16-bit data bus between the data bus buffer 173 and the gate 178 is processed by the encryption-decryption unit 177 which preferably emplements a symmetrical key algorithm, such as DES, based on a key value which stored in and fetched from the EEPROM 275 in the smartcard I.C. 250. The unit 250 encrypts data from the data bus buffer 173 prior to storing the data in the common memory array 150, and decrypts the data back into its original form when it is retrieved from the common memory array 150. This additional encryption mechanism protects data stored in the common memory array even if that data is successfully read from the flash memory chips making up the array 150. As discussed in more detail later, the secure key storage mechanism provided by the memory card may also be used to protect sensitive data being manipulated by mechanisms external to the memory card 100.

All of the operative circuitry making up the memory card 100, with the exception of the attribute memory 190, the common memory array 150, and the smartcard I.C. 250, is preferrably implemented by means of a single, monolithic application specific integrated circuit (ASIC) as indicated within the dashed line rectangle 290 in FIG. 1. By integrating this circuitry in a monolithic integrated circuit, security against invasive attempts to ascertain built-in unlock codes (to be discussed) or to bypass or disable security functions, is substantially improved.

SOFTWARE

As previously noted, the attribute memory 190 stores information which specifies the nature of the memory card 100 and the format used for the information stored on the card. The attribute memory 190 holds a Card Information Structure ("CIS") which is organized in a "Metaformat" defined in Section 5 of the PCMCIA PC (Personal Computer) Card Standard, Release 2.01, for handling numerous different data recording formats. The CIS is organized as hierarchy of layers and takes the form of a chain (linked-list) of data blocks called "tuples" which begin at address 0 of the attribute memory 190.

The PCMCIA standard also establishes standards for the operation of host processor operating system software which can be used to simplify the design of specific device drivers which provide access to the memory card. The standard "Socket Services" and "Card Services" card interface software, when implemented on a given host computer, provides a Card Services interface with "Client Device Drivers," significantly simplifying the design of device drivers by providing much of the functionality required for communicaton with socketed PCMCIA cards. For host computers which are not provided with standard PCMCIA Card Services and Socket Services functions, the device driver directly interrogates the CIS structures in the attribute memory using standard link-list processing techniques, and provide direct software support for the bulk memory functions which would otherwise be supported by the PCMCIA Card Services interface.

Whether utilizing available Card Services routines or directly addressing and manipulating the memory card hardware interface, the device drive itself may be specified in the DOS CONFIG.SYS file and loaded when the host processor is initialized, or may take the form of an independently loadable TSR program. The discussion which follows describes the operation of a Client Device Driver adapted to operate in conjunction with PCMCIA standard Card Service functions and notification mechanisms.

The programming interface to the PCMCIA Card Services software is defined in Section 3 of the PCMCIA Standard (Release 2.01) which specifies a variety of services which are available to Client Device Drivers, as well as callback mechanisms for notifying Client Device Drivers of status changes. In addition to conventional memory operations provided by Bulk Memory Service functions, the Card Services software also provides Client Utility functions which allow client device drivers to access and manipulate the CIS stored in the memory card's attribute memory 190. Card management routines, either forming a part of the Client Device Driver or part of a special purpose application program for configuring the memory card according to the users needs, are executed on the host computer. These card management routines in turn utilize the functions provided by the PCMCIA Card Services software to implement the following two special operations which not required for conventional PCMCIA memory cards:

PARTITION LOCK.

This operation accepts two parameters from the user: (1) a password value, typically taking the form of ASCIIZ (null-terminated string) of keyboarded characters entered by a user in response to a prompt, and (2) a partition identifier which specifies a portion of the address space provided by the common memory array 150. At the same time, the fact that a given partition has been locked, together with an identification of the EEPROM memory location of the password (but not its value) are recorded in the CIS entry for that partition.

The memory card 100 is intitialized as a standard memory card before being first delivered to the end user, and provides one or more freely accessible storage partitions prior to receiving the first PARTITION LOCK command.

PARTITION UNLOCK.

The storage of a password associated with a particular password has the effect of locking that password against subsequent attempts to use the data or programs stored within that partition without first supplying a valid password.

Whenever a PCMCIA card is newly inserted into the socket of a running host computer, the Client Device Driver is notified by the Card Services software (via its CARD_INSERTION callback function), so that it can process the card's CIS entries to identify each partition that may be password-protected. Similarly, when the host computer is first powered up and the Client Device Driver is initialized, the Client Device Driver calls Card Services functions to process the cards CIS entries to identify each partition that may be locked.

The device driver software then attempts to access each identified partition. If the partition is locked (as determined by the mechanism discussed above), the card lock logic 220 notifies the device driver of the locked condition, allowing the device driver to request a valid password from the user, either at the time the host computer is being initialized with an already socketed memory card, or at the time a memory card is first inserted into an already running host computer.

Other Operations.

To support encryption and decryption systems, systems employing digital signatures, and secure telecommunications access protocols, examples of which will be discussed below, the card lock logic unit 220 and UART 230 also provide the capability for storing additional passwords, key values, access codes and the like in the secure substorage system provided by the smartcard I.C. 250, or alternatively (but less securely) in the common memory array 150 or in the attribute memory 190.

PASSWORD AND KEY MANAGEMENT

Figure 2:
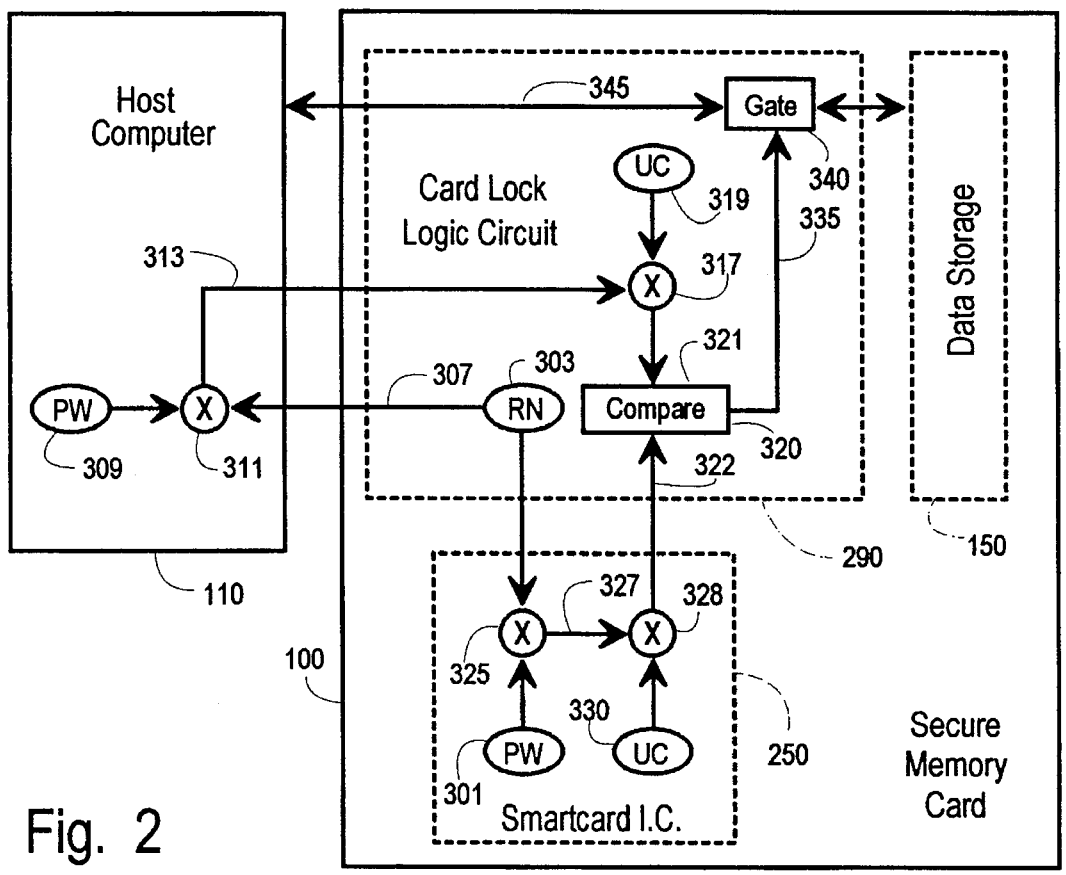
FIG. 2 is a data flow diagram depicting a preferred mechanism for providing password protection for information stored within a memory card of type shown in FIG. 1.

A preferred mechanism for validating the user's password needed to unlock a particular memory partition is illustrated in FIG. 2 of the drawings. First, as previously described, the user who desires to protect information stored on the card supplies a secret password which is written into the smartcard I.C. memory as indicated at 301. When an attempt is made to access data protected by the secret password 301, the ASIC 290 implementing the card lock logic unit 220 generates a random number 303 which is supplied to the host computer 110 as indicated at 307. The host computer 110 then prompts the user to enter a password at 309. The offered password 309 is combined with the random number 303 at 311 and the result is returned at 313 to the ASIC 290. The returned value is then combined at 317 with a fixed unlock code 319 (built into the ASIC 290) to produce a final value which is applied to a first input 321 of a comparator 320.

At the same time, the random number 303 which was sent to the host is also sent to the smartcard I.C. 250 whose processor 260 is programmed to combine the random number 303 at 325 with the previously stored secret password 301 to form a result value at 327. The result value 327 is combined at 328 with a copy 330 of the unlock code 319, and the resulting final value is applied to the second input 322 of the comparator 320. If the final value at input 321 which is created by the password offered by the user matches the final value at input 322 created by the password stored within the smartcard I.C. 250, the partition associated with the stored password will be unlocked by sending an activation signal 335 to a data flow gate 340 connected in the path of a data bus 345 connecting the host computer 350 and the memory card's common memory array 360.

It is important to observe that the data stored in a protected partition within the memory card 100 is available only to those who possess both the card and the password. Neither possession of the card without knowledge of the password, nor knowledge of the password without physical possession of the card, will be sufficient to obtain access to the data.

Figure 3:
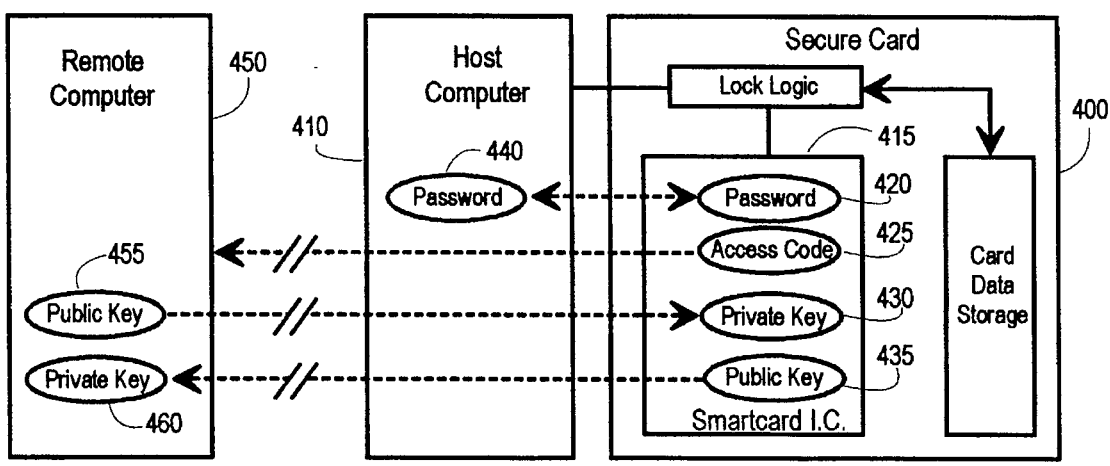
FIG. 3 is a data flow diagram illustrating the use of a secure data card as show in FIG. 1 to protect the privacy of information being sent between a host computer and a remote computer.

The combined requirement that the bearer of the card also know the password can be used to provide security for data stored or transmitted outside the memory card, as well as for data stored within the card, as illustrated by the examples depicted in FIG. 3 of the drawings.

As depicted in FIG. 3, a secure memory card 400 is connected to a host computer 410 and includes a smartcard integrated circuit 415 which provides a secure substorage system which stores a password 420, an access code 425, a private key value 430, and a public key value 435.

The password 420 is used to verify the identity of the bearer of the memory card, who is required to enter of a valid password 440 when prompted by the host computer as previously discussed in conjunction with FIG. 2. Unless a valid password 440 is known to the bearer of the memory card 400, the additional codes and keys 425, 430 and 435 cannot be retrieved from the smartcard I.C. Requests for access to the a stored key is passed to the smartcard I.C. and processed by routines stored in the smartcard I.C. internal ROM program store, which denies any incoming request which is not accompanied by the submission of a valid password 440. However, if the bearer of the memory card 400 can provide a valid password 440 which matches the stored password 420, the following additional secure transactions are made possible between the host computer 410 and a remote computer 450.

First, the remote computer 450 may deny access to one or more of its capabilities unless a proper access code is transmitted from a would be remote station which establishes communications with the computer 450, typical via a dial-up telephone connection using modem transmission, or by a dedicated connection in a network or the like. By storing the needed access code in the a password-protected PCMCIA card, an improved mechanism is provided form establishing the authority of a remote caller to access designated functions in the remote computer. Preferably, the validity of the stored access code is established by a challenge-and-response exchange of the type illustrated in FIG. 2, in which the remote computer 450 transmits a challenge in the form of a random number which is combined with the stored access code 425 to form a response which is returned to the remote computer 450 for verification. In this way, the access code 425 is not transmitted and interception of either the challenge or response values by an intruder monitoring the exchange will not provide the intruder with the access code.

After the host computer 410 establishes its identity to the satisfaction of the remote computer 450 using the stored access code 425, the host computer then may request the transmission of encrypted data from the remote computer. To accomplish this, the two stations may use a two key encryption and decryption mechanism in which the remote computer 450 encrypts the data to be transmitted with a public key 455 and the host computer, using the private key value 430 stored in the smartcard I.C. 415, decrypts the received transmission to obtain the desired message text. Other computers in the network in possession of the public key 455 may also send secure transmissions to the host computer 410, but cannot decrypt such messages from others since only the possessor of the private key 430 is able to decrypt the transmissions.

Alternatively, the smartcard I.C. may store one or more public key values such as the public key 435 which enables the host processor to send secure transmissions to a selected remote receiving computer in possession of the corresponding private key 460. In the same way, single key encryption mechanisms such as DES, and systems requiring the identification of remote senders using digital signature techniques can be readily implemented using the password protected secure memory card as the mechanism for storing the needed key values.

The DES and RSA Encryption schemes, as well as numerous other systems for the secure information transmission and retention are described in detail in *Applied Cryptography: Protocols, Algorithms, and Source Code in C* by Bruce Scheier, John Wiley & Sons (1994), ISBN 0471597562. The use of the detachable, password protected secure memory card contemplated by the present invention provides additional security by providing an improved key management mechanisms which requires that a would-be user of such a system have both physical possession of the memory card (which holds the needed key values) and knowledge of the password which permits the key values to be accessed.

It is to be understood that the specific mechanisms and techniques which have been described are merely illustrative of on application of the principles of the invention. Numerous modifications may be made to the methods and apparatus described without departing from the true spirit and scope of the invention.

What is claimed is:

1. A removable memory card including external interface terminals for establishing data, address, control and power pathways between said card and corresponding socket terminals of a host computer, said memory card comprising:

a smartcard integrated circuit including a local processor and a substorage memory unit for storing a first password value and an encryption key value, a non-volatile data storage memory, gating means having a control input, said gating means being connected to establish a data pathway between said interface terminals and said data storage memory only when an authorization signal is applied to said control input, and card lock logic means coupled to said smartcard integrated circuit for receiving a second password value from said host computer via said interface terminals, said card lock logic means including:

means for applying said authorization signal to said control input of said gating means only when said second password value bears a predetermined relation to said first password value stored in said substorage memory of said smartcard integrated circuit, means for encrypting data transferred to said data storage memory via said gating means by combining data from said interface terminals with said encryption key value from said smartcard integrated circuit, means for decrypting previously encrypted data transferred from said data storage means in response to said authorization signal by combining said encrypted data with said encryption key value stored in said substorage memory of said smartcard integrated circuit, and means for preventing the transfer of said encryption key value from said substorage memory of said smartcard integrated circuit when said second password value does not bear said predetermined relation to said first password value.

2. A data processing system comprising, in combination, a host computer including a interface connector and means for sending and receiving data via said interface connector, and a removable memory card including:

interface terminals arranged to establish electrical connections to said interface connector of said host computer, a data storage memory, a smartcard integrated circuit including means for storing a first password value and a stored encryption key value, an encryption and decryption unit connected between said interface terminals and said data storage memory for encrypting data being stored in said storage means by combining data received from said host computer with said encryption key value to produced stored encrypted data, and for thereafter decrypting said stored encrypted data by combining said encrypted data with said stored encryption key value, gating means for controlling the transmission of data signals between said interface terminals and said data storage memory in response to an authorization signal, and a card lock logic circuit comprising:

means for receiving a second password value from said host computer via said interface terminals, detection means coupled to said smartcard integrated circuit and to said gating circuit for generating said authorization signal only if said second password value has a predetermined relationship with said first password value stored in said smartcard integrated circuit, and means responsive to said authorization signal for transferring said stored encryption key value from said smartcard integrated circuit to said encryption and decryption unit.

3. A removable personal computer memory card for use with a connected personal computer, said card comprising, in combination:

a plurality of external data terminals for establishing a data pathway between said card and said personal computer, plurality of external address terminals for establishing an address pathway between said card and said personal computer, a non-volatile data memory having a data port and an address port, circuit means connected to said address terminals for applying address signals received from said personal computer via said address pathway to enable the transfer of information to or from selected locations in said data memory via said data port, encryption means connected between said external data terminals and said data port for converting data received from said personal computer via said data pathway into encrypted data applied to said data port for storage in said selected locations in said data memory, said encryption means converting data in response to and in accordance with an encryption key value, decryption means connected between said external data terminals and said data port for converting data transferred from said selected locations in said data memory into unencrypted data and for transferring said unencrypted data to said external data terminals, said decryption means converting data into said unencrypted data in response to and in accordance with said encryption key value, a smartcard integrated circuit including a local processor and a secure substorage memory unit for storing a predetermined authorization value and said encryption key value, first control means for accepting a password value from said personal computer and transferring said password value to said smartcard integrated circuit, and means including a program executable by said local processor in said smartcard integrated circuit for comparing said password value with said authorization value and for transferring said encryption key value to said decryption means to enable said decryption means only when said password value and said authorization value have a predetermined relationship to one another.

* * * * *